United States Patent
Chung

(10) Patent No.: US 6,682,251 B1
(45) Date of Patent: Jan. 27, 2004

(54) SYSTEM FOR SNAPPING A PERIFERAL DEVICE TO A CIRCUMFERENTIAL EDGE OF A PEDESTAL

(75) Inventor: Kai T. Chung, Chungli (TW)

(73) Assignee: Koninklijke Philips Electronics N.V., Eindhoven (NL)

(*) Notice: Subject to any disclaimer, the term of this patent is extended or adjusted under 35 U.S.C. 154(b) by 208 days.

(21) Appl. No.: 09/379,956

(22) Filed: Nov. 9, 2000

(51) Int. Cl.⁷ .................................................. H05K 7/00
(52) U.S. Cl. .................... 403/71; 248/221.11; 361/681; 361/682; 108/97; 108/98
(58) Field of Search .................. 403/52, 57, 60–62, 403/66, 68, 70, 71, 78, 80; D14/356, 448–452, 299, 305, 307, 371, 447; 248/349.1, 131, 221.11, 346.01, 918–922, 127, 158; 361/681, 682; 349/58; 220/789, 790; 312/223.3; 108/65, 97, 98; 415/121.2; 416/247 R

(56) References Cited

U.S. PATENT DOCUMENTS

| | | | | |
|---|---|---|---|---|
| 1,871,625 A | * | 8/1932 | Luff | 416/247 R |
| 4,863,124 A | * | 9/1989 | Ball et al. | 108/28 |
| 5,116,011 A | * | 5/1992 | Smith | 248/346 |
| 5,190,258 A | * | 3/1993 | Yu | 248/279 |
| 5,318,257 A | * | 6/1994 | Tani | 248/125 |
| 5,352,094 A | * | 10/1994 | Peng | 416/247 R |
| 5,511,674 A | * | 4/1996 | Boyd et al. | 211/70.6 |
| 5,683,070 A | * | 11/1997 | Seed | 248/442.2 |
| 5,769,374 A | * | 6/1998 | Martin et al. | 248/221.11 |
| 5,775,529 A | * | 7/1998 | Lo | 215/270 |
| 6,275,375 B1 | * | 8/2001 | Nam | 361/682 |

OTHER PUBLICATIONS

"Providing Upgradability to Computer Monitors", 628/International Business Maching Corporation Research Disclosure, May 1998, No. 409116.

* cited by examiner

Primary Examiner—John R. Cottingham
Assistant Examiner—Michael P. Ferguson

(57) ABSTRACT

A system for carrying an apparatus, such as a monitor, includes a pedestal having a base with a circumferential edge, and a peripheral device to be coupled to the pedestal. The base further includes a coupler for coupling the peripheral device thereto. The coupler is arranged to couple the peripheral device to the circumferential edge at any position thereof. This provides for flexibility and freedom of practical use when the set-up and arrangement of the system are altered, such that no substantial force has to be applied for lifting and rotating the pedestal carrying an apparatus, such as a monitor.

14 Claims, 2 Drawing Sheets

SYSTEM FOR SNAPPING A PERIFERAL DEVICE TO A CIRCUMFERENTIAL EDGE OF A PEDESTAL

BACKGROUND OF INVENTION

1. Field of the Invention

The present invention relates to a system for carrying an apparatus, such as a monitor, the system comprising:

a pedestal having a base with a circumferential edge; and a peripheral device to be coupled to the pedestal;

whereby the base has means for coupling the peripheral device thereto.

In addition the present invention relates to a peripheral device, such as, for a universal serial bus USB, and the like, suited for application in a system, the peripheral device being provided with further means for coupling to a base of a pedestal.

2. Description of the Related Art

Such a system having a pest pedestal and peripheral device is known from an article entitled: "Providing Upgradability to Computer Monitors", 628/International Business Machines Corporation Research Disclosure, May 1998, NO. 409116. The known pedestal is provided with a tilt/swivel base possibly allowing a 360° rotation. The tilt/swivel base has a plug-in for the peripheral device located therein. The peripheral device can be coupled at discrete positions, that is, either to the front or to the back of said base and can accommodate a wide range of plug-in upgrades, e.g., basic multi-media, USB hub, 1934 hub, a CD-ROM or floppy drive or device bay. Provided that the mechanical design of the tilt/swivel base provides enough space, any device could be added as an upgrade. In the case of a new set-up or arrangement of the system, a plug-in of the peripheral device can take place at the front or at the back of the tilt/swivel base, which means that, in practical situations, it may be necessary to lift the pedestal carrying the monitor or the like in order to rotate its base until the front or back side of the base is located such that the peripheral device can be plugged in at those sides. This manipulating requires a lot of force and may give rise to back injuries.

SUMMARY OF THE INVENTION

The present invention aims at obviating this drawback by providing a system, wherein such exacting handlings are not needed and even completely abandoned.

Therefore the system according to the invention is characterized in that the coupling means are arranged to couple the peripheral device to the circumferential edge at any position thereof.

It is an advantage of the system according to the invention that a peripheral device accommodating an aforementioned plug-in upgrade can now be coupled in any desired position to the circumferential edge, without any lift or rotation of the pedestal and carried peripheral device being necessary thereto. This provides for flexibility and ease of practical use, in particular after the making of changes to the system. In addition as desired even more than two peripheral devices can be coupled to the base simultaneously at desired positions along the circumferential edge of the base. A further advantage of the system according to the invention is, that the outer dimensions of the pedestral only increase, upon coupling of the peripheral device or devices to the circumferential edge of the base. That is to say in uncoupled state, the pedestral advantageously has a small size, which only increases if a peripheral device is being coupled to the circumferential edge.

An embodiment of the system according to the invention has the characterizing feature that the circumferential edge completely surrounds the base.

Advantageously, the manufacturing costs of this embodiment are low, because the circumferential edge has a uniform size. More preferably, the base is circular.

BRIEF DESCRIPTION OF THE DRAWINGS

At present the system according to the invention will be elucidated further together with its additional advantages while reference is being made to the appended drawings, wherein similar components are being referred to by means of the same reference numerals. In the drawings.

DESCRIPTION OF THE PREFERRED EMBODIMENTS

Figure 1:
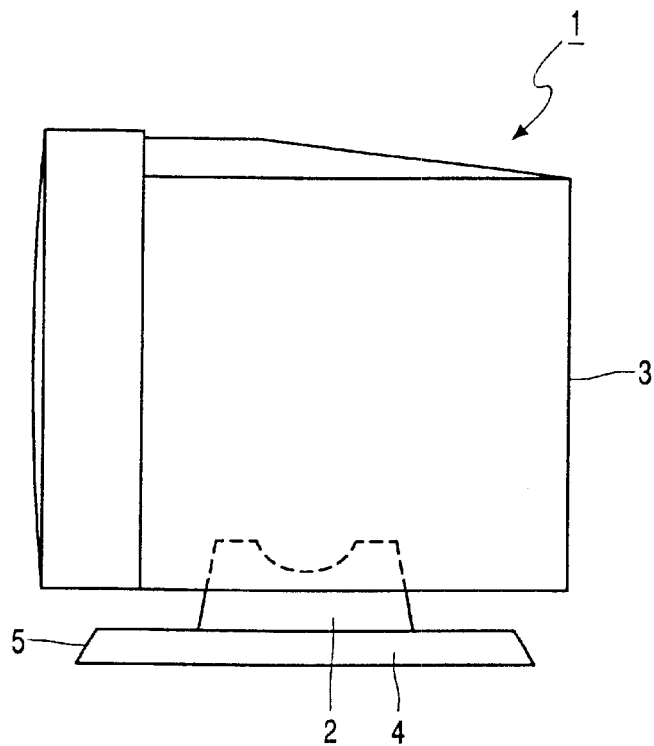
FIG. 1 shows a general prior art system having a pedestal and a monitor carried by the pedestal.

FIG. 1 shows a system 1 provided with a pedestal 2 and a apparatus 3, in this particular case, a monitor. The pedestal 2 carries the monitor 3. The pedestal 2 has a base 4, which has a circumferential edge 5.

Figure 2A:
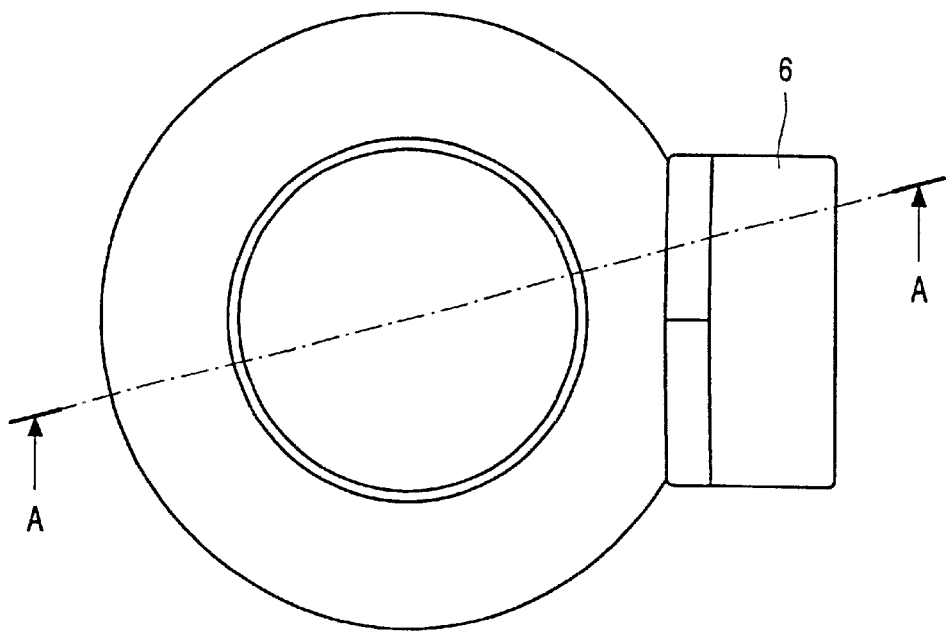
FIGS. 2a–2f show an top view, a side view, a front view, a isometrical view, a cross-sectional view along the line A—A in FIG. 2a and a detail of coupling means which is encircled in FIG. 2e, respectively.
Figure 2B:
Figure 2C:
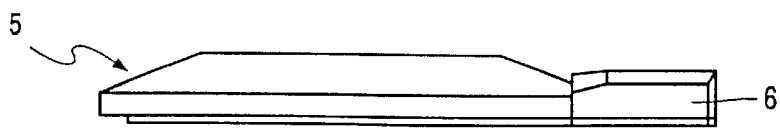
Figure 2D:
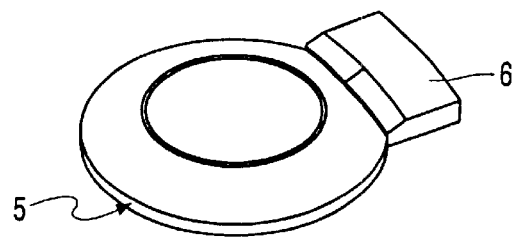
Figure 2E:
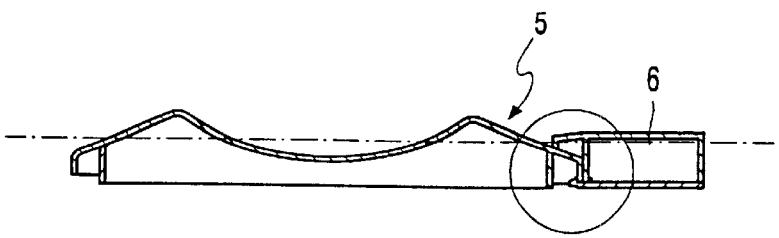
Figure 2F:
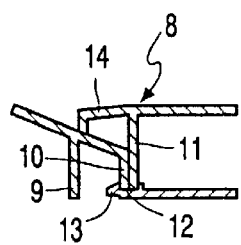

FIGS. 2a–2f show particular views as detailed above of the system 1, wherein the base 4 is circular, but of course it may have any desired form, such as rectangular, square, etc. The system 1 as shown here is provided with a peripheral device 6, which is coupled to the base 4 by being coupled to its circumferential edge 5. The peripheral device 6 may be any sort of upgrade, as mentioned hereinbefore. The circumferential edge 5 and the peripheral device 6 are embodied with mutually cooperating coupling means 7 and 8 respectively. The means 7, 8 may be coupled at any position along the circumferential edge 5, this edge encompassing the base 4 completely. The outline of a possible embodiment of the coupling means 7, 8 are shown in FIG. 2e and its encircled detail in FIG. 2f. In the case as shown, the coupling means is embodied as coupling means 7, 8, which is detachable from the edge 5, and can be snapped and/or clicked thereto. The edge 5, forming one part of the coupling means, has two parallel legs 9 and 10, the former being longer than the latter, so that the bottom side of leg 9 can rest on for examples, a table (not shown). Corresponding coupling means 8 of the peripheral device 6 has mutually perpendicular legs 11 and 12. Ground leg 12 has an extended portion provided with a projection 13 for gripping and catching joined legs 10 and 11, while leg 10 is pressed in engagement with leg 11 by a press finger 14, which is connected to leg 11 of the coupling means. Advantageously the coupling means 7, 8 can be engaged by moving edge 5 and peripheral device 6 toward one another, such that both are pressingly snapped and clicked to one another. Detachment of the coupled coupling means 7 and 8 can be achieved by rotating and pressing the peripheral device 6 slightly downward against the elastic force of the press finger 14 relative to the edge 5, such that the clicking projection 13 releases the legs 10 and 11.

The peripheral device may be detachably coupled to the base 4 in any other way known to the skilled person. For example, the base 4 may have small holes along its circumferential edge, and the peripheral device 6 may have small pins cooperating with these holes.

What is claimed is:

1. A system for carrying a monitor, the system comprising:
   a pedestal having a base with a circumferential edge; and
   a peripheral device to be coupled to the pedestal; whereby the base comprises means for detachably snap coupling the peripheral device thereto;
   characterized in that the coupling means allows the peripheral device to be detachably snap coupled to the circumferential edge at every position along its perimeter thereof; and
   said peripheral device being coupled to a portion, which is less than all, of said circumferential edge.

2. A system according to claim 1, characterized in that the circumferential edge completely surrounds the base.

3. A system according to claim 1, characterized in that the base is circular.

4. A system according to claim 1, characterized in that the circumferential edge forms part of the coupling means.

5. A pedestal suited for application in a system for carrying a monitor, said pedestal comprising:
   a base having a circumferential edge; and
   means for detachably snap coupling a peripheral device to the base;
   characterized in that the coupling means allows the peripheral device to be detachably snap coupled to a portion, which is less than all, of the circumferential edge of the base at every position along its perimeter thereof.

6. A pedestal according to claim 5, characterized in that the circumferential edge completely surrounds the base.

7. A system for carrying a monitor, comprising:
   a pedestal having a base with a circumferential edge that includes a first coupling portion;
   a peripheral device having a second coupling portion detachably attachable to said first coupling portion;
   said first coupling portion having a leg in contact with a leg of said second coupling portion when said pedestal is attached to said peripheral device;
   said second coupling portion including a gripping projection in contact with said leg of said first coupling portion; and
   said peripheral device being attachable to a portion, which is less than all, of said circumferential edge at every position along its perimeter thereof.

8. The system of claim 7 wherein said leg of said first coupling portion is parallel to said leg of said second coupling portion when said pedestal is attached to said peripheral device.

9. The system of claim 8 wherein said leg of said first coupling portion is trapped between said gripping projection and said leg of said second coupling portion.

10. The system of claim 9 wherein said second coupling portion includes a press finger operable to urge said leg of said first coupling portion into engagement with said leg of said second coupling portion.

11. The system of claim 7 wherein said leg of said first coupling portion is trapped between said gripping projection and said leg of said second coupling portion.

12. The system of claim 11 wherein said second coupling portion includes a press finger operable to urge said leg of said first coupling portion into engagement with said leg of said second coupling portion.

13. The system of claim 7 wherein said second coupling portion includes a press finger operable to urge said leg of said first coupling portion into engagement with said leg of said second coupling portion.

14. The system of claim 7 wherein said pedestal and said peripheral device are detached at least in part by rotating said peripheral device with respect to said pedestal.

* * * * *